Patented July 7, 1931

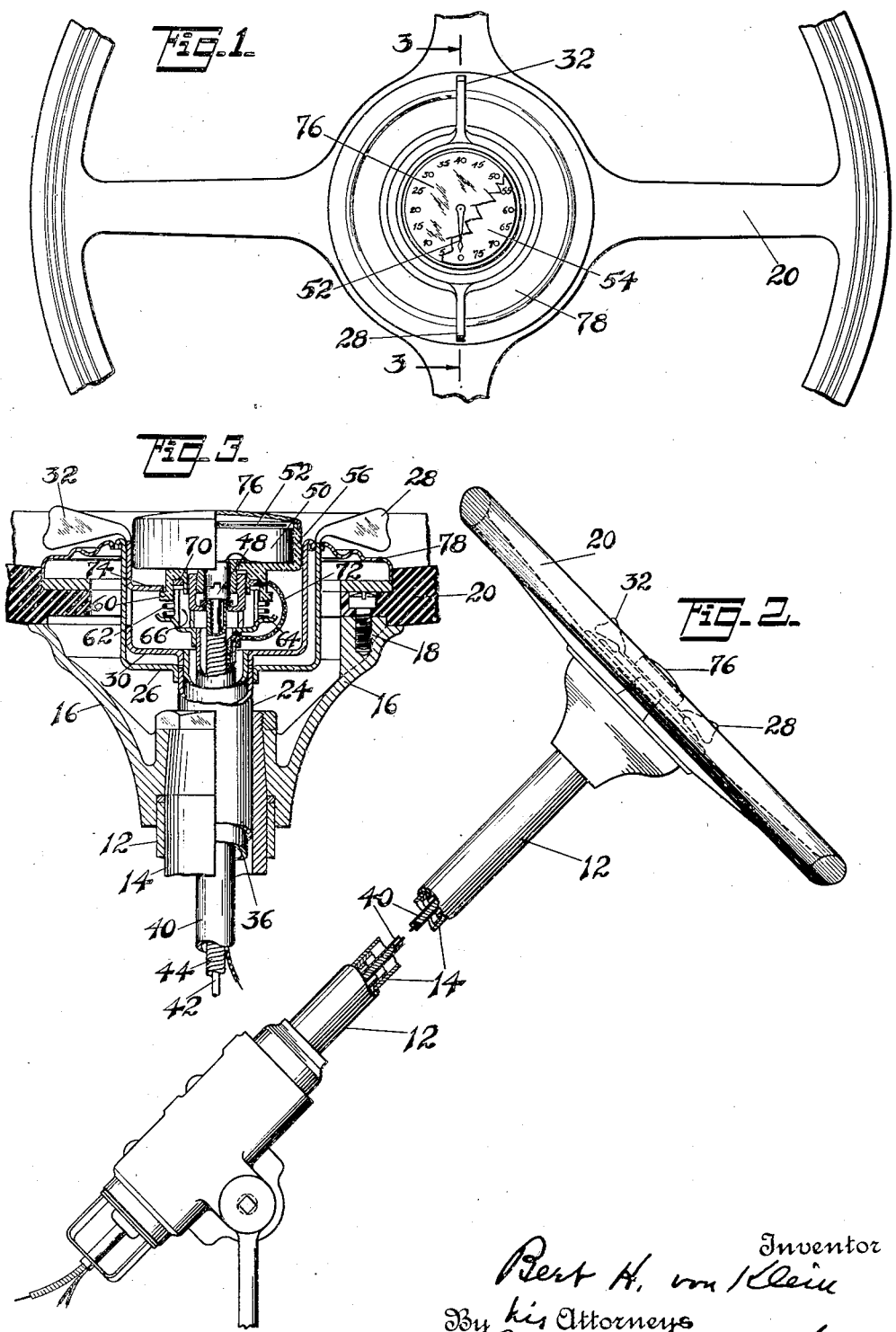

1,813,003

UNITED STATES PATENT OFFICE

BERT H. von KLEIN, OF NEW YORK, N. Y.

SPEEDOMETER

Application filed November 21, 1930. Serial No. 497,362.

The present invention relates to speedometers.

The principal object of the invention is the promotion of safety in driving by a speedometer construction and arrangement that requires the operator of a motor vehicle to divert his attention from the road as short a time as possible in order to ascertain his driving speed.

A further object of the invention is the provision of a novel construction at the center of a steering wheel, said construction embodying a movable contact make-and-break member in the form of a speedometer housing.

Other objects of the invention will appear from the following description taken in connection with the accompanying drawings which illustrate, by way of example, a preferred embodiment of the invention and in which, Figure 1 is a fragmentary top plan view showing a steering wheel having centrally located mechanism constructed in accordance with the invention;

Figure 2 is a side elevation of a steering column provided with the steering wheel and mechanism of Figure 1;

Figure 3 is a vertical sectional view taken on the line 3—3 of Figure 1.

Referring in detail to the drawings, a tubular column or steering post 12 contains the rotatable steering tube 14, fast to the upper end of which is a spider 16 to which is secured, by machine screws 18, or otherwise, a steering wheel 20.

The spider 16 provides an open space in the center of the steering wheel and extending downwardly in a direction axially of the steering column.

Within the steering tube 14 is an independently rotatable tubular light control member 24 to the upper end of which is secured an outer cup 26 provided at its upper rim with a manually operable light control lever 28.

Within the cup 26 is located an independently rotatable cup 30 provided at its upper end with a hand throttle or fuel control lever 32. The cup 26 is secured to the upper portion of a fuel control tube 36 independently rotatable within the tube 24.

From the mechanism described the steering is accomplished and the fuel and lights controlled in any suitable conventional or desired manner.

Within the tube 36, extending axially of the steering column and rigidly mounted therein is a stationary tubular member 40 which, in the present embodiment of the invention, serves as a housing for a speedometer actuating device herein shown as having the form of a flexible rotatable driving member 42 located within a flexible non-rotatable casing 44. The lower end of the flexible driving member 42 may be connected to and rotated by any suitable part of the automobile, such as wheel, the transmission, cam shaft, distributor, etc. The upper end of the flexible driving member 42 is connected by a coupling 48 with the speedometer drive.

The speedometer herein shown includes a casing 50 which contains the speedometer mechanism for moving an indicator or pointer 52 over the face of a graduated scale or dial 54.

The speedometer, as a whole, is carried within a speedometer housing 56 which is formed as a cup-shaped member fitting within the inner cup 30 and movable axially thereof for the purpose of making and breaking a circuit, such, for example, as the automobile warning signal circuit.

For this purpose, the speedometer housing 56 is provided with a flange 60 extending downwardly therefrom and in contact with the upper end of a coil spring 62, under compression, the lower end of which bears against a relatively stationary abutment plate and contact member 64 which is secured to the upper end of the rigid tube 40 and is provided with upwardly extending fingers 66 serving as a ground for the stationary terminal in the automobile horn circuit. A movable terminal is provided in the form of a contact ring 70 set in the underside of the speedometer housing 56 to which one of the conduits 72 of the horn circuit is connected. The speedometer housing 56, as a whole, is urged constantly upwardly against a limit stop 74 which may be fast with respect to the cup 30 within which the speedometer housing has limited axial movement. Downward movement of the speedometer housing is limited by contact of ring 70 against finger 66.

The speedometer housing 56 is formed of insulating material and is provided in its upper face with a viewing window closed by a transparent cover 76 through which the speedometer indicating pointer 52 may be observed by the operator of the vehicle.

The annular space between the outer cup 26 and the steering wheel 20 is closed by a cover plate 78.

It will be evident that with the foregoing construction the operator of a motor vehicle may inform himself of his road speed without looking either to the right or left of his driving direction and the vertical angle between his line of sight for driving and his line of sight for speedometer reading is relatively small.

It is also to be observed that the speedometer housing, in accordance with the present invention, as here embodied, serves as the movable contact member of a switch in the automobile warning signal circuit.

What is claimed is:

1. In an automobile, steering mechanism, a movable indicator housing associated therewith, an indicator within said housing, said housing having a viewing opening therein, a transparent cover for said opening, a contact member carried by said indicator housing, and a circuit including said contact member having a conduit carried by said steering mechanism.

2. In an automobile, steering mechanism, a movable speedometer housing associated therewith, a speedometer fixed in and movable with said housing, said housing having in its top a viewing opening, a transparent cover closing said opening, a contact member carried by and movable with said housing, and a circuit including said contact member having a conduit within said steering mechanism.

3. In an automobile, a steering column, steering mechanism carried thereby including a steering wheel, an indicator housing movably mounted centrally of said steering wheel and provided with a viewing opening, a transparent cover over said opening, a speedometer in said indicator housing, means for guiding said housing in rectilinear movement axially of said steering wheel, a circuit having a fixed switch terminal adjacent said housing and having a movable terminal carried by said housing, and a conduit in said steering column in contact with one of said terminals.

In testimony whereof, I have hereunto set my hand.

BERT H. von KLEIN.